United States Patent
Dominic

(10) Patent No.: US 7,525,902 B2
(45) Date of Patent: Apr. 28, 2009

(54) FAULT TOLERANT SYMMETRIC MULTI-COMPUTING SYSTEM

(76) Inventor: Anilkumar Dominic, 5240 Arno Ct., San Jose, CA (US) 95138

( * ) Notice: Subject to any disclaimer, the term of this patent is extended or adjusted under 35 U.S.C. 154(b) by 898 days.

(21) Appl. No.: 10/942,260

(22) Filed: Sep. 15, 2004

(65) Prior Publication Data
US 2005/0063300 A1 Mar. 24, 2005

Related U.S. Application Data

(60) Provisional application No. 60/505,091, filed on Sep. 22, 2003.

(51) Int. Cl.
*H04J 1/16* (2006.01)
*H04J 3/14* (2006.01)
(52) U.S. Cl. .................. 370/216; 709/238
(58) Field of Classification Search .............. None
See application file for complete search history.

(56) References Cited

U.S. PATENT DOCUMENTS

| | | | |
|---|---|---|---|
| 6,507,863 B2* | 1/2003 | Novaes | 709/201 |
| 6,532,233 B1 | 3/2003 | Matsunaga et al. | |
| 6,580,722 B1 | 6/2003 | Perlman | |
| 6,665,304 B2* | 12/2003 | Beck et al. | 370/401 |
| 6,801,949 B1 | 10/2004 | Bruck et al. | |
| 6,820,133 B1 | 11/2004 | Grove et al. | |
| 6,829,637 B2 | 12/2004 | Kokku et al. | |
| 6,839,348 B2* | 1/2005 | Tang et al. | 370/390 |
| 7,149,678 B2 | 12/2006 | Gurevich et al. | |
| 7,292,584 B1 | 11/2007 | Rautiainen et al. | |
| 2001/0053156 A1 | 12/2001 | Higuchi et al. | |
| 2003/0126464 A1 | 7/2003 | McDaniel et al. | |
| 2003/0147390 A1 | 8/2003 | Rizzo et al. | |
| 2003/0174706 A1* | 9/2003 | Shankar et al. | 370/393 |
| 2003/0233540 A1 | 12/2003 | Banerjee et al. | |
| 2004/0107234 A1 | 6/2004 | Rajahalme | |
| 2004/0148421 A1* | 7/2004 | Achtermann et al. | 709/232 |
| 2005/0066035 A1 | 3/2005 | Williams et al. | |

OTHER PUBLICATIONS

"Fault Tolerance And Load Balance Clustering For MySQL," Emic Networks, Jan. 2003, 23 pages.
"Fault Tolerance And Load Balance Clustering For MySQL White Paper," Emic Networks, Jan. 2003, 23 pages.
"Fault Tolerance And Load Balance Clustering For MySQL White Paper," Emic Networks, Sep. 2003, 23 pages.

(Continued)

*Primary Examiner*—Ajit Patel
(74) *Attorney, Agent, or Firm*—Fenwick & West LLP

(57) ABSTRACT

A system enabled for fault-tolerant symmetric multi-computing using a group of nodes is described hereon. A symmetrical group of nodes networked using a reliable, ordered, and atomic group-to-group TCP communication system is used in providing fault-tolerance and single system image to client applications. The communication between the client and the group is standards based. The processing load is shared among a group of nodes with transparent distribution of tasks to application segments. The system is fault-tolerant in that if a node fails remaining replicas if any continue service without disruption of service or connection. Nodes may be added to or retired from the group in a manner transparent to the client as well as server applications.

19 Claims, 7 Drawing Sheets

OTHER PUBLICATIONS

Introduction To TCP/IP, Feb. 2, 1995, [online] [Retrieved on Aug. 18, 2003] Retrieved from the Internet <URL:http://pclt.cis.yale.edu/pclt/COMM/TCPIP.HTM> 7 pages.

Kokku, R. et al., "Half-Pipe Anchoring: An Efficient Technique For Multiple Connection Handoff," pp. 1-20.

Kokku, R. et al., "Half-Pipe Anchoring: An Efficient Technique For Multiple Connection Handoff," pp. 1-25.

Deering, S., "Host Extensions for IP Multicasting," Network Working Group, RFC 1112, Aug. 1989, pp. 1-17.

Gemmell, J. et al., "The PGM Reliable Multicast Protocol," Network, IEEE, Dec. 2001, pp. 1-13, vol. 17, Issue 1.

Liang, S., "TCP-SMO: Extending TCP to Support Medium-Scale Multicast Applications," INFOCOM 2002, Twenty-First Annual Joint Conference on the IEEE Computer and Communication Proceedings, IEEE, 2002, pp. 1-10, vol. 3.

Liang, S., "Unifying the Transport Layer of a Packet-Switched Internetwork," Dissertation, Department of Electrical Engineering, Stanford University, Mar. 2003, 158 pages.

Talpade, R. et al., "Single Connection Emulation (SCE): An Architecture for Providing a Reliable Multicast Transport Service," 1994, 13 pages.

Aron, M. et al., "Scalable Content-Aware Request Distribution In Cluster-Based Network Servers," To appear in Proc. Of the 2000 Annual Usenix Technical Conference, Jun. 2000, 14 pages, San Diego, CA.

Becker, T., "Application-Transparent Fault Tolerance In Distributed Systems," Proceedings 2nd International Workshop on Configurable Distributed Systems, Mar. 21-23, 1994, pp. 36-45, Pittsburgh, PA.

"Emic Application Cluster: Administrator's Guide," Emic Networks, Jan. 2003, 108 pages.

"Emic Application Cluster: Administrator's Guide," Emic Networks, Jan. 2003, 115 pages.

"Emic Application Cluster For Apache," Emic Application Cluster, 2002-2003, 2 pages.

"Emic Application Cluster For MySQL," Emic Application Cluster, 2002-2003, 2 pages.

"Emic Application Cluster 2.0 For MySQL," Emic Networks, 2003, 2 pages.

"Emic Application Cluster 2.0 For MySQL, Architecture White Paper," Emic Networks, Nov. 2003, 10 pages.

"Fault Tolerance And Load Balance Clustering For Apache," Emic Networks, Jan. 2003, 12 pages.

"Fault Tolerance And Load Balance Clustering For Apache," Emic Networks, Jul. 2003, 12 pages.

Introduction To TCP/IP, Feb. 2, 1995, [online] [Retrieved on Aug. 18, 2003] Retrieved from the Internet <URL:http://pclt.cis.yale.edu/pclt/COMM/TCPIP.HTM>.

* cited by examiner

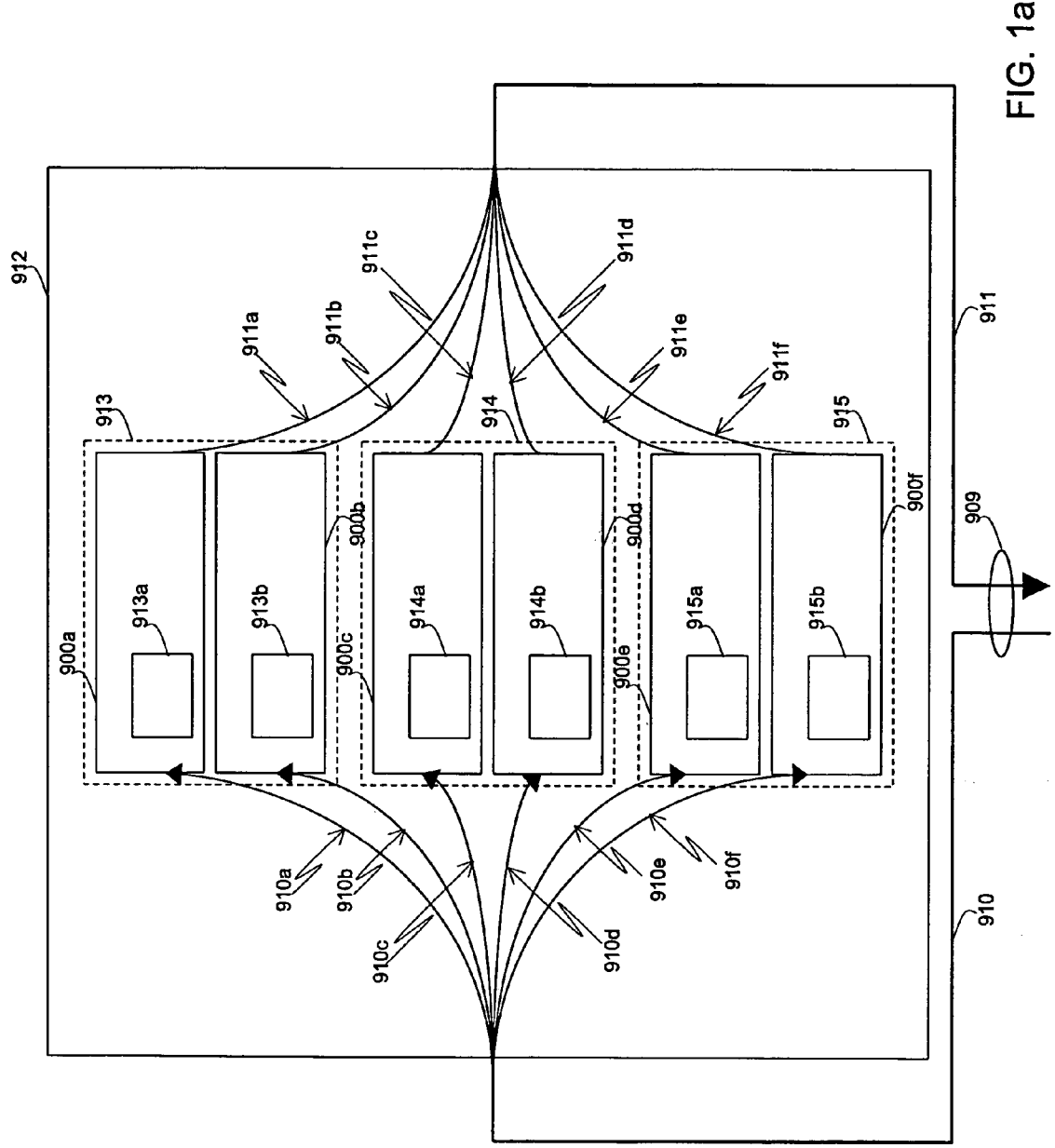

FAULT TOLERANT SYMMETRIC MULTI-COMPUTING SYSTEM

CROSS REFERENCE TO RELATED APPLICATIONS

This application claims the benefit of U.S. Provisional Application No. 60/505,091, filed Sep. 22, 2003, which is incorporated by reference in its entirety.

This application is related to the co-pending U.S. application Ser. No. 10/942,763, entitled "Group-to-Group Communication Over a Single Connection," (Inventor: Anilkumar Dominic), filed Sep. 15, 2004, which is herein incorporated by reference in its entirety.

BACKGROUND OF THE INVENTION

1. Field of the Invention

The present invention relates to a fault tolerant multi computing system using group-to-group communication scheme.

2. Brief Description of the Related Arts

For the optimal resource utilization, flexibility and reduced management costs the industry demands solutions based on a "utility computing" model where processing power and storage capacity can be added as need and resources are provisioned dynamically to meet changing needs. Conventional mainframe solutions are beyond the reach of average enterprises due to high cost. There are large number of high performance but low-cost "blade servers" and networking technologies available in the market. However, a solution that aggregates these resources efficiently and flexibly and can run wide range of applications to meet the utility computing needs does not exist today.

The client-server paradigm is popular in the industry due to its simplicity in which a client makes a request and server responds with an answer. To enable this paradigm, a popular communications protocol used between a client and a server in a communication network is, transmission control protocol/Internet Protocol, or simply, "TCP/IP." In the communication network, a client (or client system or machine) views a server (or server system or machine) as a single logical host or entity. A single physical server is often incapable of effectively servicing large number of clients. Further, a failed server leaves clients inoperable.

To address the shortcomings of a single physical server, cluster configurations having many servers running in parallel or grid to serve clients were developed using load-balancers. These configurations provide potential benefits, such as, fault-tolerance, lower cost, efficiency and flexibility comparable to mainframes. However, these and other benefits remain largely unrealized due to their inherent limitations and lack of a standard platform most applications can build on.

In addition to physical clustering, conventional software systems have also made efforts to introduce clustering at application level and operating system levels. However, shortcomings of such software configurations include instances where clustering is embedded in the application results in limited usage of those applications. Similarly, although operating system level clustering is attractive, conventional efforts in these areas have not been successful due to large number of abstractions that must be virtualized.

In contrast to physical server and software application and operating system clustering, network level clustering does not suffer from either of the problems and provides some attractive benefits. For example, the ability to address the cluster of server nodes as a single virtual entity is a requirement to be useful in client server programming. Further, the ability to easily create virtual clusters with a pool of nodes adds to better utilization and mainframe class flexibility.

A conventional network level-clustering platform must be generic and usable by a wide range of applications. These applications range from, web-servers, storage servers, database servers, scientific and application grid computing. These conventional network level clusters must enable aggregation of compute power and capacity of nodes, such that applications scale seamlessly. Existing applications must be able to be run with minimal no or changes. However, conventional network level clusters have had only limited success.

To the extent there has been any success of the Symmetric Multi-Processor (SMP) architecture, it can be attributed to the simplicity of the bus, which made processor and memory location transparent to applications. For clustering too, simplicity of a virtual bus connecting server nodes provides node location transparency and node identity transparency. However, such conventional systems lack the capability of allowing a bus to be directly tapped by client applications for efficiency. Similarly, buses based on User Datagram Protocol ("UDP") packet broadcast and multicast lack data delivery guarantees, resulting in application level clustering.

The single most used protocol with delivery guarantees by the industry is TCP/IP. The TCP's data delivery guarantee, ordered delivery guarantee and ubiquity, makes it particularly desirable for virtualization. However, TCP's support for just two-end points per connection has limited its potential. Asymmetrical organization of processing elements/nodes that have pre-assigned tasks such as distributing incoming requests to cluster are inherently inflexible and difficult to manage and balance load. Asymmetrical nodes are often single point of failures and bottlenecks. In order for MC (Multi Computing) to succeed, there is a need for symmetrical organization as opposed asymmetrical node organization.

Another problem with asymmetry in a client-server environment is latency. Switches and routers employ specialized hardware to reduce latency of data passing through. When data must pass through node's UDP/TCP/IP stack, it adds significant latency due to copying and processing. Hence, in order to achieve optimal performance, systems must avoid passing of data through intervening nodes having asymmetric organization. However, if a server node's CPUs must handle large amount of network traffic, application throughput and processing suffers. Thus, conventional systems must use hardware accelerators such as specialized adaptor cards or Integrated Circuit chips to reduce latency at the endpoints and improve application performance. This increases system costs and complexity.

Low-cost fault-tolerance is a is highly desired by many enterprise applications. Solutions where fixed number of redundant hardware components are used suffer from lack of flexibility, lack of ability to repair easily and higher cost due to complexity. Solutions today offer high availability by quickly switching services to a stand-by server after fault occurred. As the stand-by systems are passive its resources only not utilized resulting in higher cost. In the simplest yet powerful form of fault tolerance by replication, the service over a connection continue without disruption upon failure of nodes.

On traditional clusters, an active node performs tasks and passive nodes later update with changes. In many instances, there are fewer updates compared to other tasks such as query. Machines are best utilized when load is shared among all replicas while updates are reflected on replicas. Replica updates must be synchronous and must be made in the same order for consistency. With atomic delivery, data is guaranteed delivered to all target endpoints, before client is sent with a TCP ACK indicating the data receipt. In the event of a replica failure, remainder of the replicas can continue service avoiding connection disruption to effect fault-tolerance. Non atomic replication lacks usability. Specifically, when a client request is received by replicas of a services, each produce a response. As client views server as a single entity it must be made sure that only one instance of the response is sent back to client. Similarly, when multiple client replicas attempt to send same request, it must be made sure that only one instance is sent out to server. Conventional systems often fail to provide atomicity, and therefore, lack fault tolerance avoiding connection disruption.

Another problem with conventional clustering systems is load balancing. As with any system, the ability balance load evenly among nodes is necessary for optimal application performance. However, conventional clustering systems provide only limited support for standard load balancing schemes, for example, round-robin, content hashed, and weighted priority. Moreover, many conventional clustering systems are unable to support implementing application specific load-balancing schemes.

Many services have load levels varying significantly in a cluster depending on time. Running processes may need to be migrated for retiring an active server. Conventional cluster systems often lack support for adding or removing nodes/replicas to cluster in a manner that is easily performed and without disrupting the service.

A number of attempts have been made to address network level virtualization. However, each attempt has still resulted in significant shortcomings. For example, one conventional solution is a device for balancing load in a cluster of Web-Servers is popular in the industry. This load-balancing device, which is also disclosed in U.S. Pat. Nos. 6,006,264 and 6,449,647, switches incoming client TCP connections to a server in a pool of servers. A conventional server for this process is Microsoft's Network Load balancer software, which broadcasts or multicasts client packets to all nodes by a switch or router. However, once a connection is mapped, the same server handles all client requests for the life of TCP connection in a conventional one-to-one relationship.

A problem with conventional systems such as the ones above is when a service is comprised of different types of tasks running on nodes, it fails to provide a complete solution because any mapped server that would not run all services client would request over a connection results in service failure. This limits the use of such systems to web-page serving in which only one task of serving pages is replicated to many nodes. In addition, any mapping of devices implemented external to a server is a bottleneck and results in a single point of failure. Further, because a connection has only two end points, replication is not supported. Therefore, with such single ended TCP, updates are not reflected on replicas, and hence, there are considerable limits on usability.

To address some of the shortcomings of the above conventional systems, other conventional systems attempted to distribute client requests over a connection to nodes serving different tasks. Ravi Kokku et al disclosed one such system, in "Half Pipe Anchoring." Half pipe anchoring was based on backend forwarding. In this scheme when a client request arrives in the cluster of servers, a designated server accept the requests and after examination of the data, forwards to an optimal server. The optimal server, given with connection state information later responds to the client directly after altering the addresses to mach the original target address. Here a single TCP end-point is dynamically mapped to nodes to distribute requests. This scheme is an example of "asymmetric" approach in that an intervening node intercepts the data and distribute it based on data content.

Another conventional system attempting to achieve asymmetric organization is disclosed in two whitepapers by EMIC Networks Inc. In this conventional system, a designated node intercepts and captures incoming data and later reliably delivers it to multiple nodes, using proprietary protocols. Sometimes only one node is permitted to transmit data, and data must be transmitted first to a designated server which later retransmits it to client. Here also the single end-point is dynamically mapped and the TCP connection terminates at the intervening node where replication is initiated. This scheme is another example of "asymmetric" approach in that an intervening node intercepts the data and replicate it.

Both schemes described above maintain the TCP definition of two endpoints, although they may be mapped to different nodes. Replication in these conventional schemes is performed at the application level using proprietary protocols. Further, these conventional schemes employ asymmetric node organization, where select nodes act as application level router that distributes requests. However, such asymmetry results in scalability limitations as noted in "Scalable Content Aware Request Distribution in Cluster Based Network Servers" by Aaron et al. These limitations include a single point of failure, data throughput bottlenecks, suboptimal performance due to higher latency, and lack of location transparency.

Therefore, there is a need for a symmetric system and a method for using the current definition of TCP's two end-points to provide m-to-n connections (m, n, being any integer, which may be the same to different).

SUMMARY OF THE INVENTION

The above mentioned and other requirements are met by a group of nodes networked symmetrically using an atomic group-to-group TCP communication system. The system delivers a single system image to the client as well as server applications. The communication between the client and the group is standards based in that any standard TCP/IP endpoint is able to seamlessly communicate with the group.

The system is fault-tolerant in that if nodes running an application fails, a set of remaining application replicas in the group continue service without disruption of the connections and service. Nodes may be added to or retired from the group dynamically, to maintain a certain quality of service in a manner transparent to the applications. For the purpose of balancing load among nodes or retiring a node, system transparently migrates active services and re-distribute tasks within the group.

Applications running on nodes of a group are able to view and operate remainder of the group as single virtual entity simplifying client/server application programming and resource management. An embodiment of present invention allows for dividing applications into one or more segments independently running over group nodes, often in a manner transparent to the applications that no code change is required.

The system shares the processing load among a group of nodes by dynamically and transparently distributing incoming tasks over a connection to various application segments. A single request arriving over a connection may be serviced by multiple segments working in cohesion, enabling finer distribution of computation or processing among the nodes. The system allows for multiple instances of a segment run in parallel. Requests are delivered to the instances selected based on schemes such as round-robin, least loaded node, affinity based, content hashing.

Incoming requests over a connection are delivered atomically to multiple segment instances for fault-tolerance. The results are optionally compared and a single instance is output. Upon failure of segments/nodes, remaining segment instances continue service without disruption of the connection.

The system allows for flexible and external management of the system, by distributing tasks in a fine-grained fashion controlling and configuring filters at the connection endpoints. When retired, load responsibilities of the node are migrated to another node selected using schemes such as lowest loaded, round robin or an application specific scheme. The system automatically and dynamically adds resources to the group from a pool to meet changing needs. Similarly, nodes are retired and provisioned dynamically and automatically. The system maintains specific quality of service adding or retiring resources automatically and dynamically.

In addition, it is noted that the system maintains specific quality of service adding or retiring resources dynamically and automatically. For balancing load among nodes or retiring a node, system transparently migrates active services to other nodes. Distribution of tasks is controlled external to applications by management software. Client applications view and operate a cluster of nodes as a single virtual entity. A node communicates with other nodes of a group by creating a connection to the virtual entity represented by the group. Application running on a node is also able to view and operate remainder of the group as single virtual entity simplifying the programming and management.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention has other advantages and features which will be more readily apparent from the following detailed description of the present invention and the appended claims, when taken in conjunction with the accompanying drawings, in which:

Figure ("FIG.") 1a is a generalized diagram of a symmetric multi-computer system with fault tolerance, load distribution, load sharing and single system image in accordance with one embodiment of the present invention.

DETAILED DESCRIPTION OF THE INVENTION

Figure 2A:
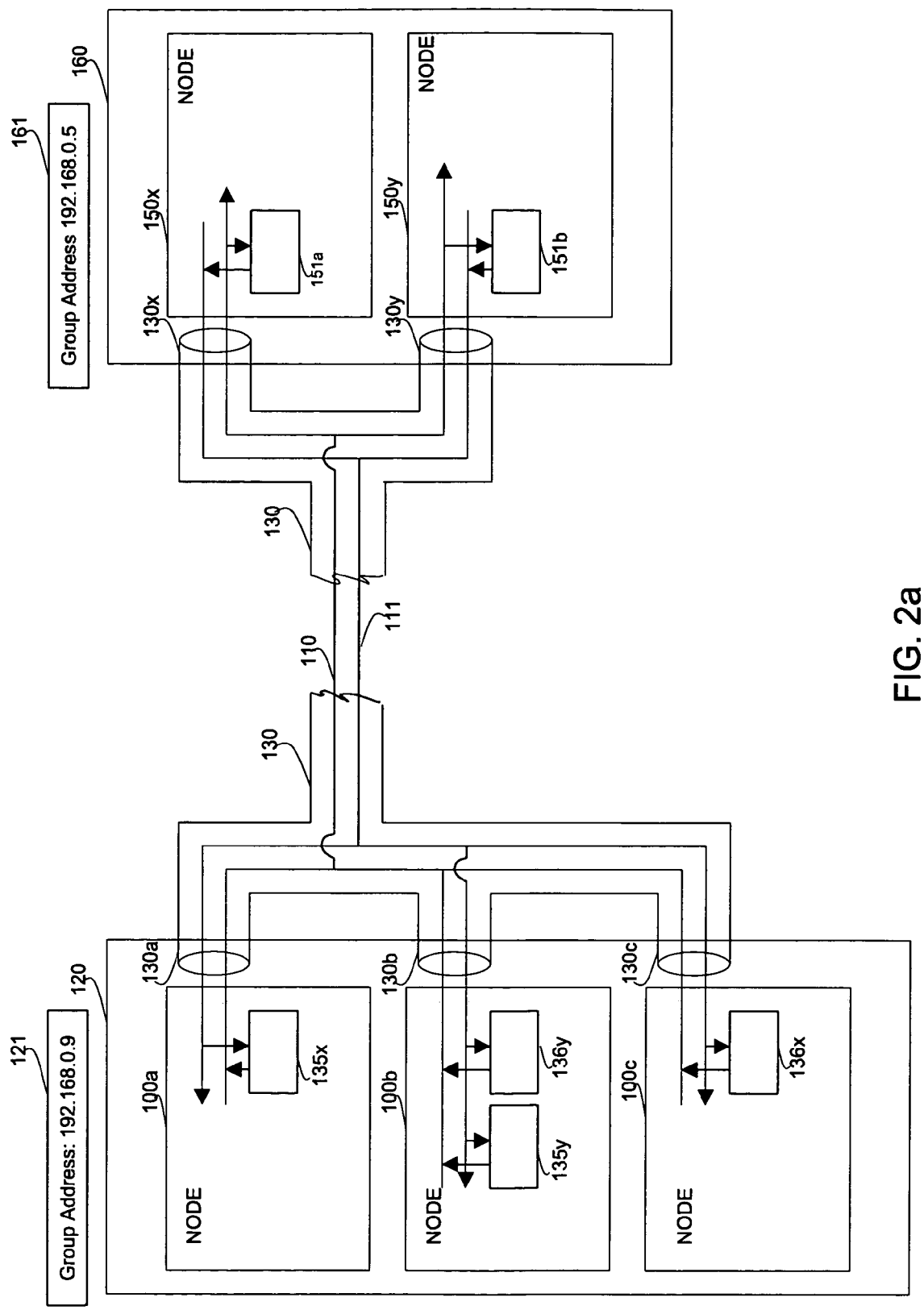
FIG. 2a is a generalized diagram of communication system constructed in accordance with one embodiment the present invention.

The present invention includes a fault-tolerant multi computing system based on symmetric group-to-group TCP communication system, that efficiently shares load among a group of nodes by distributing tasks in a manner transparent to client and server applications.

Introduction

It is noted that for purposes of ease of understanding, a node refers to a connection on a network. For example, a data processing device such as general purpose computers, other devices having a microprocessor, or software configured for operation in a device may be referenced to as a node. A group refers to a collection of one or more nodes organized symmetrically. An application segment refers to a segment of an application that may serve in conjunction with other application segments running on various group nodes. An application is comprised of one or more application segments and an application segment is comprised of one or more processes.

A sendHead refers to a transmitting end of a TCP connection, which controls data transmission and maintains the transmission state at the node. A receiveHead refers to the receiving end of a TCP connection, which controls data reception on connection and maintains data reception state at the node. An active sendHead refers to the sendHead that is designated to have latest transmission state information, for example, sequence number of data and sequence number of last acknowledgement.

A bus controller refers to a node that controls and/or coordinates connection establishment and termination process with a peer group. A signal refers to a message exchanged within a node group over a logical bus. When a source and a target of a signal are within a same node, no signal is sent out, although it may amount to the effect of receiving it internally. A TCP end-point refers to an end application entry point such as socket at which data and acknowledgment for received data originates. A request refers to a select segment of incoming data stream, for example, a client request for service.

Load Sharing and Load Balancing

Referring now to FIG. 1a, illustrated is a symmetric multi-computer system in accordance with one embodiment of the present invention. The server group (912) is comprised of a number of nodes 900a,b,c,d,e,f. The input stream (910) of TCP connection (909) has multiple endpoints 910a,b,c,d,e,f that span over the group nodes. Similarly the output stream (911) of the same connection is comprised of endpoints 911a, b,c,d,e,f.

The application is comprised of three segments (913, 914, 915) running over the entire group with two instances for each application segment 913a,b, 914a,b, 915a,b. By programming the communication system, the segments are delivered with specific tasks based on criteria such as operations they perform, the data they manage. By configuring the data delivery such a way that specific subsets of requests for services are delivered to specific instances of applications, segmentation of application is achieved, in many cases without code change to existing applications. Applications may be segmented in many ways, examples include segmenting based on type or kind of requests a segment can handle, a hashing algorithm based on data content or connection information such as sequence number etc. It is also trivially possible that application is divided in to segments by programming them into different segments.

The group nodes are paired as replicas 900*a,b*, 900*c,d* and 900*e,f* such that each pair run two instances of the application segment 913, 914, 915 respectively. Upon failure of a segment say 900*a* the pair 900*b* continue service without disruption. If failure of an instance say 900*a* happen while transmitting, the other instance 900*b* will send the remainder of the response to peer avoiding disruption of service. Similarly a new application segment instance may be added to a group so as to increase the fault-tolerance due added instance available to continue service in the face of failures. This may be done for example by creating a new process running application segment instance and then getting it added to group so that requests are distributed to it accordingly.

In one mode of operation, non-empty subsets of groups are delivered with requests in specific orders such as round-robin and weighted priority that requests are essentially distributed among said non-empty subsets so as to balance the load on nodes.

In one mode of operation one or more replicas are delivered with a task, and after the task is complete the results from instances are sent out through the connection without regard for others. In another mode of replica operation, one or more replicas may be delivered with same task. The relevant replicas then execute the operation in parallel and produces results. An output filter installed at the output stream of the group-to-group communication system compares results and a single instance of the result is sent out to a peer group whereby the group appear as a single entity to peer group. The selection of output instance transmitted to peer group depends on the policy set in the filter such as equal outputs, majority agreement, correct result or successful operation output etc. Selection of the policy depends on the application. Upon failure of a transmitting segment instance, a replica takes over and continues transmissions without connection disruption.

When output comparison result by the output content filter indicates differing outputs produced by nodes, a subset replicas are considered faulty and excluded from further service over connection while remaining endpoints continue service without connection disruption. In an embodiment having the exclusion of an endpoint, such exclusion is based on schemes where majority of endpoints agree on a result to exclude others. Alternatively, exclusion of endpoints may occur where an operation failed. Exclusion of an endpoint may also be from any application specific scheme that is programmable with filter.

In yet another mode of operation, the replicas are delivered with operations that result in state changes such as modified data in memory and storage. This way replicas maintain a consistent state. When operations that does not affect consistency between replicas such as read operation, the task is delivered to only an instance of the replica. This enable balancing of load between the replicas.

Node Addition and Retirement

The filters at the connection end point of the TCP group-to-group communication system, enable fine-grain control of data delivery to application segments. By dynamically configuring filters certain tasks are delivered to certain nodes, enabling external control over the delivery of task requests to node. Thus flow of requests to application segments are controlled like a switch for fine task distribution among nodes.

The group may be added with nodes any time. A newly added node may share load from existing connections and new connections. For existing connections, nodes join the service and starts accepting tasks arriving on it. When necessary load among nodes are balanced by migration of tasks.

For node retirement, load responsibilities of the node are migrated to another, selected using schemes such as lowest loaded, round robin or an application specific scheme. While retiring, waiting for smaller tasks to finish while not accepting new tasks, the nodes are freed-up completely. When long running tasks are involved, the migration of tasks such as system level process migration is used. With process migration the entire context of application process such as stack, data open files are moved to another node transparently. Nodes communicate with other nodes of a group creating a connection to the address of the virtual entity represented by the group. This provides all the above features for communication between group nodes.

Automatic Provisioning

The system automatically and dynamically adds resources to the group from a pool to meet changing needs. Similarly, nodes are retired and provisioned dynamically and automatically. The system monitors the quality of the service delivered to the clients and maintains specific quality of service adding or retiring resources. The operations can be done external to the system and are potentially transparent to the peer group.

Underlying Group-to-group Communication System

Referring now to FIG. 2*a*, illustrated is a communication system used in one embodiment of the present invention. The communication system includes a TCP connection 130 that couples between a first group 120 and a second group 160. By way of example, the first group 120 has a first, second, and third member nodes 100*a*, 100*b*, 100*c* and the second group 160 has a first and second member nodes 150*x* and 150*y*. The member nodes in either group are organized symmetrically in that each node has equal access to a TCP connection and operates independently and in parallel. A first data stream 110 and a second data stream 111 can flow between the first group 120 and the second group 160 of the communication system.

A first application segment 135 and a second application segment 136 constitute a server application on 120. The first application segment 135 has a set of replicas 135*x*, 135*y* and the second application segment 136 also has a set of replicas 136*x*, 136*y*. The application segment replicas 135*x* and 135*y* runs over nodes 100*a* and 100*b* respectively while the replicas 136*y* and 136*x* runs over nodes 100*b*, 100*c* respectively. A client application at group 160 is comprised of an application segment 151 with replicas 111*a* and 151*b*.

Application segments 135 and 136 of the first group 120, communicate over the connection 130 with segment 151 of the second group 160. The two data streams 110 and 111 of the connection 130 follow TCP protocols. The connection 130 may have three different connection end points 130*a*, 130*b*, 130*c* at the first group 120 and two different connections end points 130*x* and 130*y* at the group 160 on the same connection.

Each group 120, 160 is assigned a respective group Internet Protocol ("IP") address 121, 161. Groups view each other as a single entity while being composed of nodes. Communications between two groups 120, 160 are addressed to each other through the group IP addresses 121, 161. When a request from say segment 151 arrives at the first group 120, it is viewed as data coming from group IP address 161. Similarly, the second group 160 sends data targeted to group address 121.

The endpoints 130*a*, 130*b* and 130*c* at the first group 120 may be set such that one or more of the application segment replicas 135*a*, 135*b*, 136*a*, 135*b* are delivered with an incoming request. Examples of the different policies by which data delivered to application segments are, all replicas, one replica, all application segments and select application segments, target determined based on request content, based on round-robin request distribution, based on a hashing scheme to map request to a specific node and weighted priority etc.

Either of the endpoints 130x or 130y at the second group 160 may send request to server group 120. One or more of the receiveHeads at the endpoints 130a, 130b, 130c at the first group 120 receives the data depending on the settings. The endpoints 130a, 130b, 130c at the first group 120 may send response data which is received at the endpoints 130x, 130y at the second group 160. Application processes wanting to receive certain or all in coming data are guaranteed to have received it before acknowledging client with the receipt of data. In order to maintain TCP's sequential order of data transmission, the TCP sequence numbers are assigned in sequential order before data transmission starts.

Optionally, duplicate data output by replicas 151a and 151b in the second group 160 are reduced to a single instance to be transmitted to the first group 120 by the communication system. Similarly, optionally output of replicas of application segments 135, 136 in the first group 120 may also be reduced to one. It is not necessary that replicas of 135a, 135b, 136a, 136b must produce outputs since in many cases request is delivered to only one replica depending on the settings.

The communication system in accordance with the present invention provides client/server requests and responses that are beneficially atomic. That is, they are sent or received as a contiguous sequence of bytes, enabling multiple processes over two groups send and receive data over a single connection.

The protocol between groups 120 and 160 is TCP and data is guaranteed to be delivered in the sequential order it was sent as per conventional TCP. When targeted to multiple end points, it is guaranteed that data is delivered to all targets end points or before client is sent with TCP ACK segment indicating the receipt of data. Optionally, when replica outputs must be reduced to transmission of a single copy output, it is guaranteed that output is atomic in that data is transmitted if all nodes output same data. However when results don't match applications may optionally choose output to transmit based majority agreement or correct or successful result, etc.

With application segmentation, application processes are typically delivered with only select portions of an incoming data stream for processing. For example, requests arriving on the second data stream 111 may be delivered to select applications segments. The order of the delivery of data to application processes must be guaranteed to be the order in which it was sent as specified by RFC 793. I.e. before certain data is delivered to an application segment all preceding data arrived in the stream must be successfully delivered to its target application end-points.

Figure 2B:
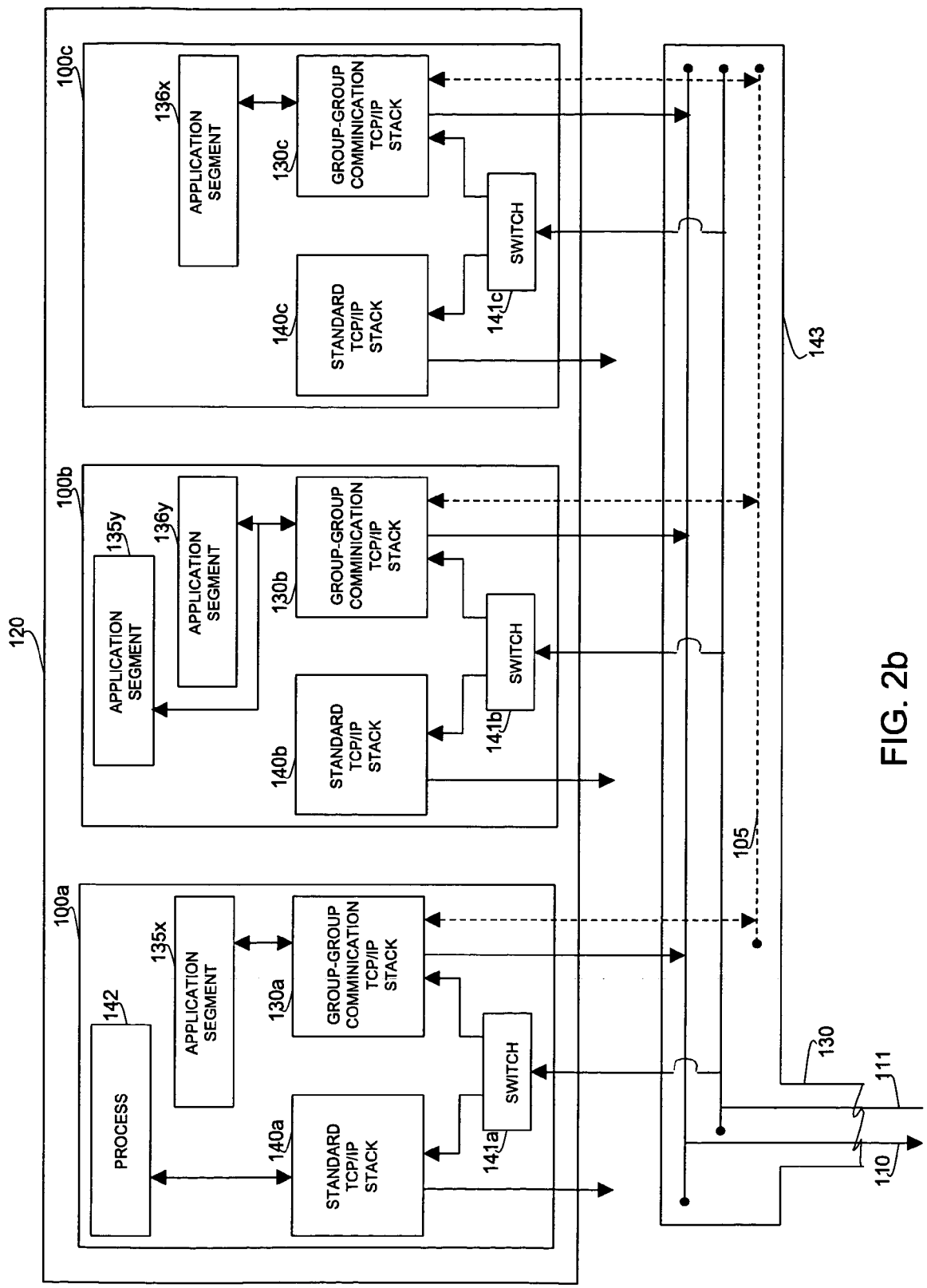
FIG. 2b is a block diagram illustrating a communication system in accordance with one embodiment of the present invention.

Referring to FIG. 2b, the first group 120 is comprised of the first, second, and third nodes 100a, 100b, 100c. The connection 130 between the first group 120 and the second group 160 has the outgoing and the incoming data streams 110, 111. Each node 100 has a group-to-group communication stack 130a-c respectively. The delivery of data to all of the nodes is through a switch 141a-c coupled with the respective nodes 100a-c. No assumption about the delivery guarantees to switch 141a-c by the underlying hardware is made, since popular hardware technologies such as Ethernet are unreliable. Delivery of data to each node 100a-c or any of its subsets may be selective or no delivery at all is possible by the underlying hardware devices.

The incoming data is switched by the switch 141a-c to either regular TCP/IP stack 140a-c or to the group-to-group communication stack 130a-c, based on the IP address and/or port. An application process 142 of node 100 communicates using the standard TCP stack 140. The application segments 135x,y, 136a,y communicate with group communication stack 130 respectively. The 105 carry control signals that coordinate and controls operations of group 131. The scope of the signals sent over control bus 105 is limited to the first group 120. The virtual bus 143 is comprised of the first and the second data streams 110, 111 and control signals 105 spanning group 120. This bus is directly tapped into by the peer group TCP connection 130.

An alternative to the virtual bus 143 is the point to point communication between nodes and has the advantage of better bandwidth usage. However, this necessitates each node in a communication system to keep track of other nodes and their addresses and their roles. In one embodiment, a logical bus model is preferred over control messaging due to location and identity transparency.

Figure 2C:
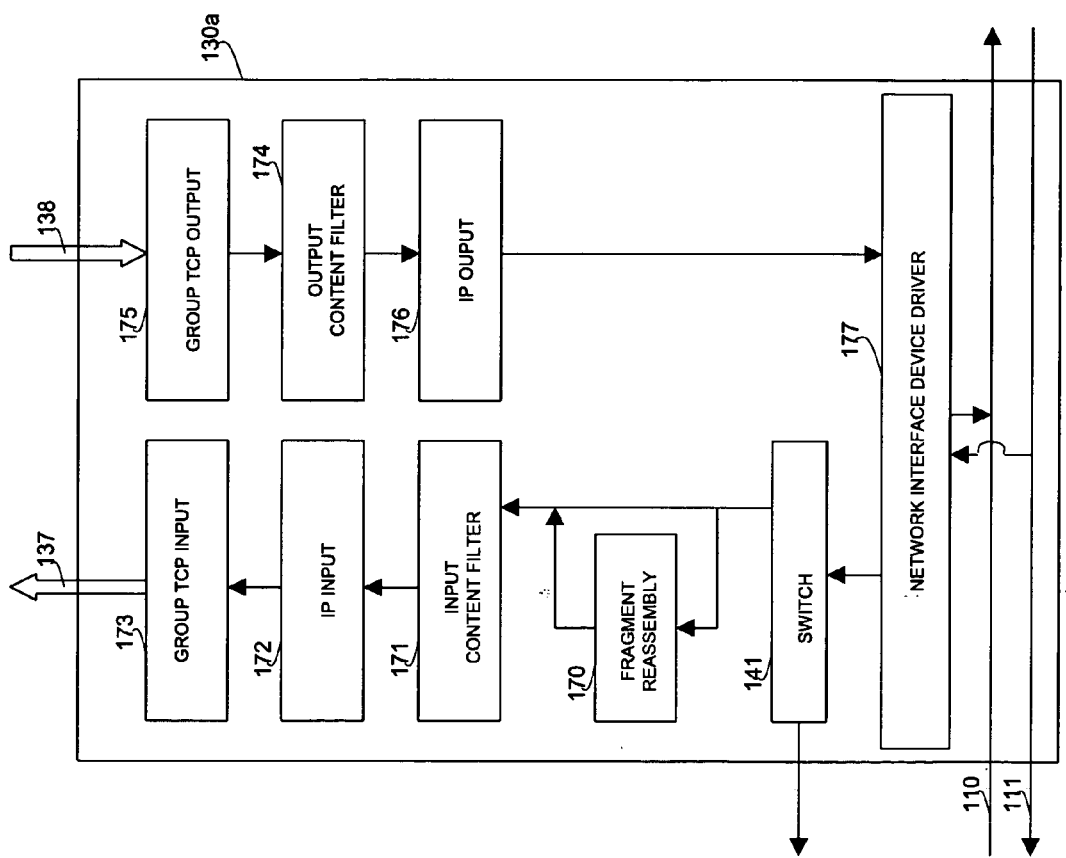
FIG. 2c illustrates a block diagram of organization of higher-level components for implementation of a communication system in accordance with one embodiment of the present invention.

Referring to FIG. 2c illustrated is the connection end point 130a in accordance with one embodiment of the present invention. Generally, the switch 141 directs data to either standard TCP stack or the group-group communication stacks Internet Protocol ("IP") input 171. For fragmented IP packets, 170 performs reassembly before passed to 171. When input packet is not fragmented, it may be passed directly to the input content filter 171 after few basic consistency checks. The input content filter 171 examines the input data content and or packet header to determine if it contains data to be passed in to the application segment (e.g., 135x, 135y, or 136x).

If the communication system determines not to pass packet further up, it is discarded with no further action and any memory is freed. Otherwise the input content filter 171 marks segments of the packet that is being passed into application. The packet is then passed to IP input processing layer 172 for complete validation including checksum computation and other consistency checks. Any invalid packets are discarded with no further processing. Resulting packets are then passed into a group-group TCP layer 173. The group-group TCP layer 173 coordinates with group nodes (e.g., 120, 160) and controls data receipt to meet TCP specification requirements such as acknowledgements to peer group. The group-group TCP layer 173 maintains the input TCP states of connection and passes data to socket through 137. The output data path (137) and input data path (138) interfaces with to application socket for connections such as 130.

The user socket sends out data invoking an output content filter 174. In one embodiment, the output content filter 174 is not installed, and hence, performs no operation. A filter for fault tolerance, synchronously compare data to be sent with other replica segment outputs and transmits a single output instance. The selection of output instance transmitted to peer group depends on the policy set in the filter such as equal outputs, majority agreement, correct result or successful operation output etc. Upon failure of a transmitting segment instance, a replica takes over and continues transmissions without connection disruption. At successful output instance reception at peer group, the replicas discard the data and frees up memory. The output content filter 174 passes data for transmission, to a group TCP output layer 175. The group TCP output layer 175 controls data transmission and maintain transmission states in conjunction with group nodes. The group TCP output layer 175 works with its group nodes to transmit data to peer group in the sequential order as specified by TCP. The group TCP output layer 175 passes an IP output layer 176 with data to transmit. The IP output layer 176 later performs standard IP functions on the data and passes it down to device driver 177 for data transmission.

When an output comparison result by the output content filter 174 indicates differing outputs produced by nodes, a subset replicas are considered faulty and excluded from further service over connection while remaining endpoints continue service without connection disruption. In an embodiment having the exclusion of an endpoint, such exclusion is based on schemes where majority of endpoints agree on a result to exclude others. Alternatively, exclusion of endpoints may occur where an operation failed. Exclusion of an endpoint may also be from any application specific scheme that is programmable with filter. Upon failure of an endpoint during transmission of data, a replica endpoint if any completes the transmission without disruption of the connection.

Data Output Over a Connection

Multiple end points of a group may transmit data in TCP order. It is thus necessary to assign consecutive sequence numbers to segments of data to be transmitted. It is also necessary to maintain of the consistency of data transmitted, in order to avoid mixing up distinct request/responses from endpoints. For this purpose each complete request/response data is treated as a record by the transmitting node.

Node Based Group-to-group Communication

Figure 3A:
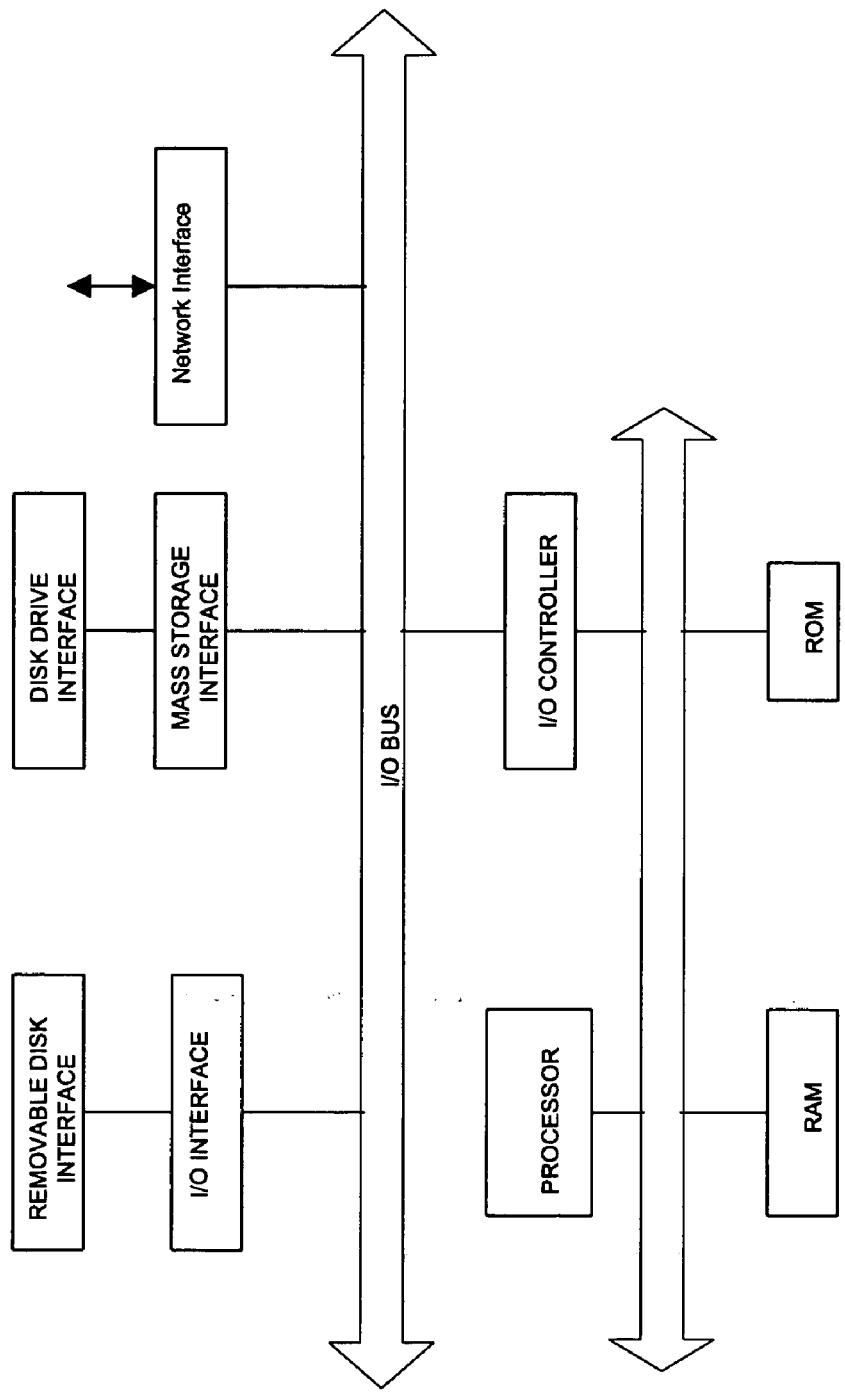
FIG. 3a illustrates a block diagram of a computing system for a communication system in accordance with one embodiment of the present invention.

Referring to FIG. 3a, it is a block diagram of a general computer and its elements suitable for implementing elements of invention. Here the group-to-group communication stack is executed by the processor(s) in the system.

Group-to-group Communication Offloading the Main CPU

Figure 3B:
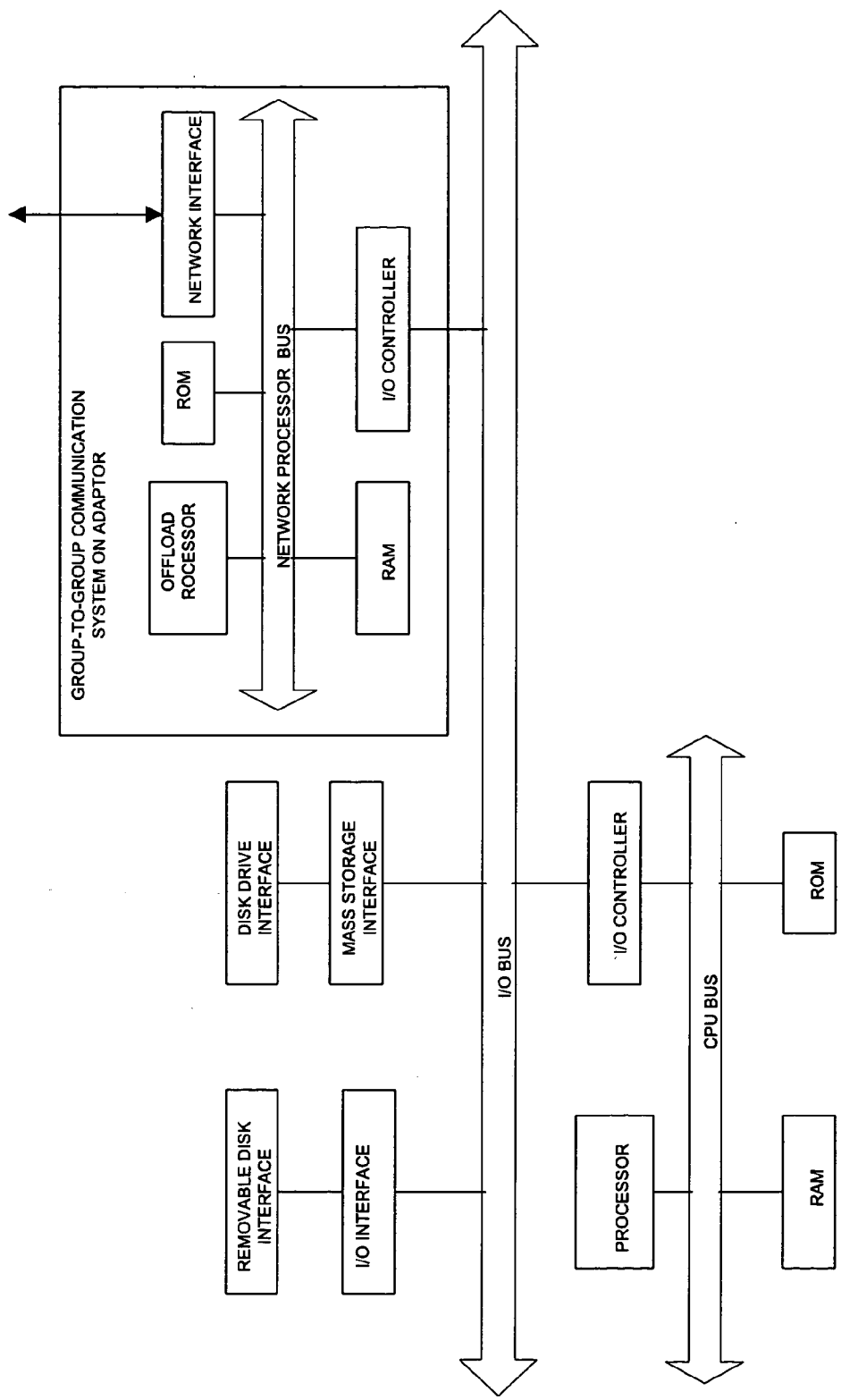
FIG. 3b illustrates a block diagram of a computing system for a communication system having providing offloading of a main processor in accordance with one embodiment of the present invention.

Referring to FIG. 3b, it is a block diagram of a computer and its elements suitable for implementing elements of invention while offloading main processor from processing certain elements. The group-group communication stack is offloaded to an adaptor card with it own processor.

Group-to-group Communication on Integrated Circuits

Figure 3C:
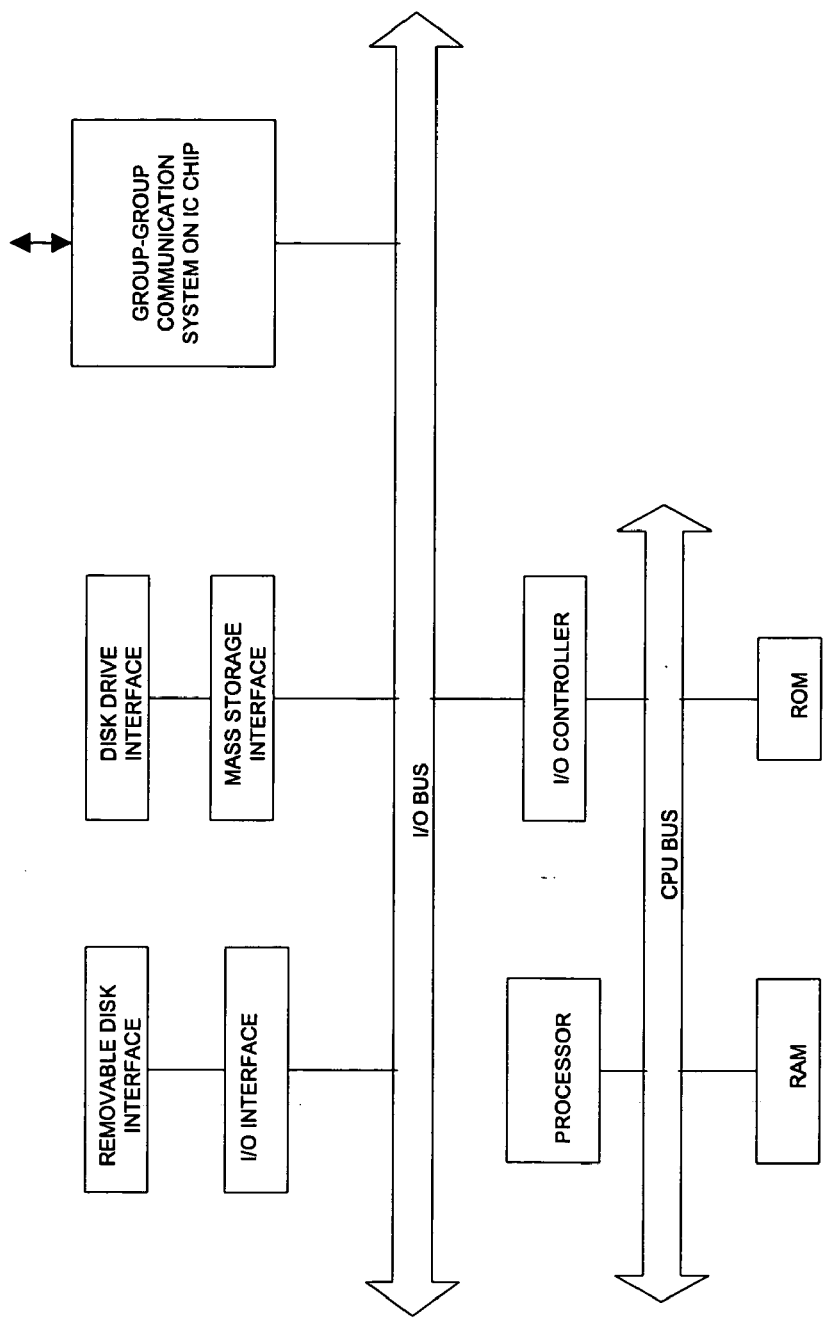
FIG. 3c illustrates a block diagram of a computing system for a communication system providing offloading of a main processor to dedicated hardware/accelerator chips in accordance with one embodiment of the present invention.

Referring to FIG. 3c, it is a block diagram of a computer and its elements suitable for implementing elements of invention while offloading main processor from processing certain elements of invention to dedicated hardware/accelerator integrated chips. The offloads most of the processing required otherwise by the main CPU by implementing the group-group communication stack fully or partially.

Referring to FIG. 4, illustrated is a logical view of an implementation where input data is shared as in a bus however the output data is switched. The 400 is the input data stream from the peer group. The 410 is a logical half-bus where only input is shared using multicast or a shared media such as Ethernet. The 420, 421 and 422 represent the bus input end-points to the nodes 430, 431 and 432 respectively and 440, 441 and 442 are the output end points that get fed into a layer 2 or layer 3 IP switching device 450. The 460 represent the aggregate output produced by the nodes 430, 431 and 432 produced for input 400. The 400 and 460 respectively forms input and output of a single connection.

Upon reading this disclosure, those of skill in the art will appreciate still additional alternative structural and functional designs for fault tolerant symmetric multi-computing, in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

I claim:

1. A fault-tolerant multi-computing system, the system comprising:
   a first application at a first group comprised of one or more first application segments, each first application segment having a plurality of first replicas, and each first replica residing in a node in the first group;
   a second application at a second group comprised of one or more second application segments, each second application segment having a plurality of second replicas, and each second replica residing in a node in the second group;
   a logical connection interconnecting the first group and the second group, the logical connection comprised of a plurality of endpoints, each endpoint coupled to a node; and
   each of the plurality of first replicas of a first application segment configured to process a request received from the second group, the request intended for the first application segment.

2. The system of claim 1, wherein each of the plurality of endpoints is configured to allow the exchange of data between the first group and the second group.

3. The system of claim 1, wherein each endpoint coupled to a node in the first group is configured to:
   compare a first response by a first replica of a first application segment to a second response by at least one other first replica of the first application segment; and
   determine the appropriate response to transmit to the second group based on the comparison.

4. The system of claim 3, wherein the first replica resides in a node coupled to the endpoint and the other first replica resides in a distinct node.

5. The system of claim 3, wherein the appropriate response to transmit to the second group is determined by applying at least one of the following policies during the comparison: equal output, majority agreement, correct result, and successful operation output.

6. The system of claim 1, wherein the request received by each of the plurality of first replicas of the first application segment is received directly from the second group.

7. The system of claim 1, wherein each of the plurality of endpoints comprises a protocol stack.

8. The system of claim 1, wherein each of the plurality of endpoints is configured to deliver requests received to application segments coupled to the endpoint in a specific order.

9. The system of claim 1, wherein each of the plurality of endpoints is configured to atomically deliver requests received to a node coupled to the endpoint.

10. The system of claim 1, wherein the logical connection comprises Transmission Control Protocol (TCP) and corresponding interfaces.

11. A method for processing requests with fault-tolerance by one or more nodes within a computing system, the method comprising:
   dividing a first application at a first group into one or more first application segments, each first application segment having a plurality of first replicas, and each first replica residing in a node in the first group;
   dividing a second application at a second group into one or more second application segments, each second application segment having a plurality of second replicas, and each second replica residing in a node in the second group;

establishing a logical connection interconnecting the first group and the second group, the logical connection comprised of a plurality of endpoints, each endpoint coupled to a node; and processing a request received from the second group by each of the plurality of replicas of a first application segment, the request intended for the application segment.

12. The method of claim 11, wherein each of the plurality of endpoints allows the exchange of data through the logical connection between the first group and the second group.

13. The method of claim 11, further comprising:
comparing a first response by a first replica of a first application segment to a second response by at least one other first replica of the first application segment; and
determining the appropriate response to transmit to the second group based on the comparison.

14. The method of claim 13, wherein the appropriate response to transmit to the second group is determined by applying one or more of the following policies during the comparison: equal output, majority agreement, correct result, and successful operation output.

15. The system of claim 11, wherein the request received by each of the plurality of first replicas of the first application segment is received directly from the second group.

16. The system of claim 11, wherein each of the plurality of endpoints comprises a protocol stack.

17. The system of claim 11, wherein requests received are delivered to application segments in a specific order.

18. The system of claim 11, wherein requests received are atomically delivered to nodes.

19. The system of claim 11, wherein the logical connection comprises Transmission Control Protocol (TCP) and corresponding interfaces.

* * * * *